Oct. 11, 1955   R. W. KLING   2,720,417
STABILIZING HITCH
Filed Nov. 24 1951   6 Sheets-Sheet 1
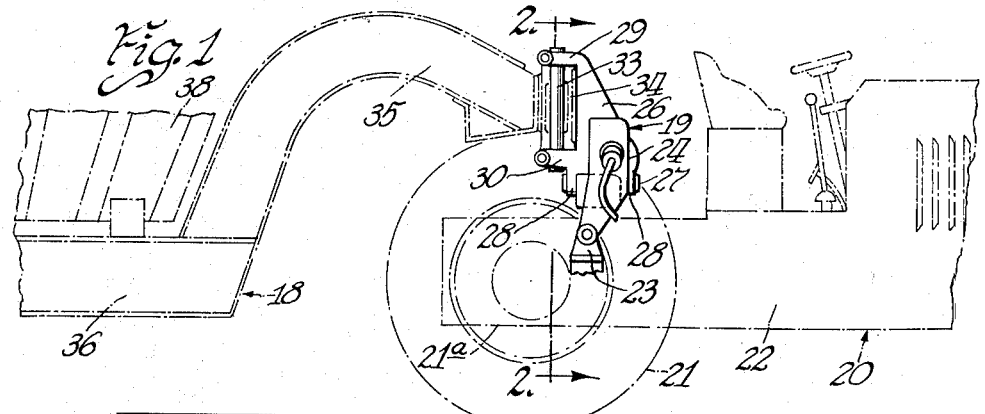
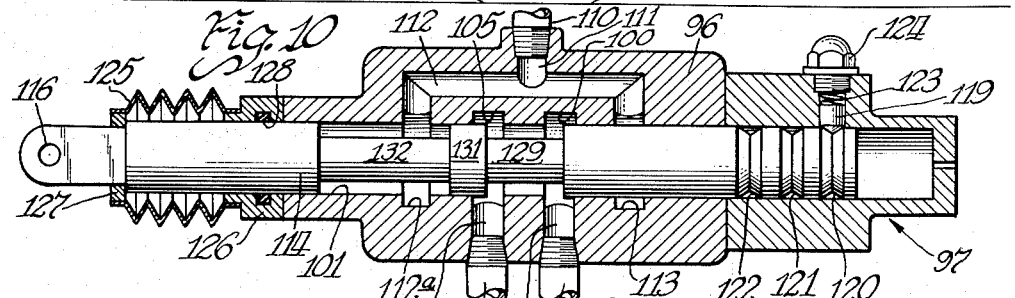
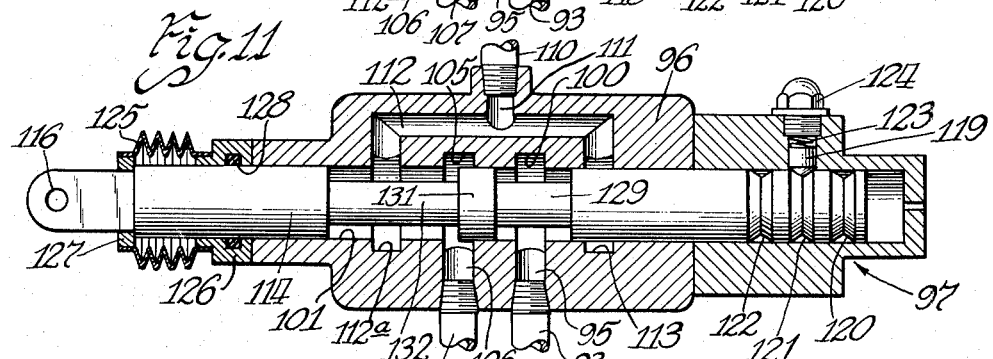
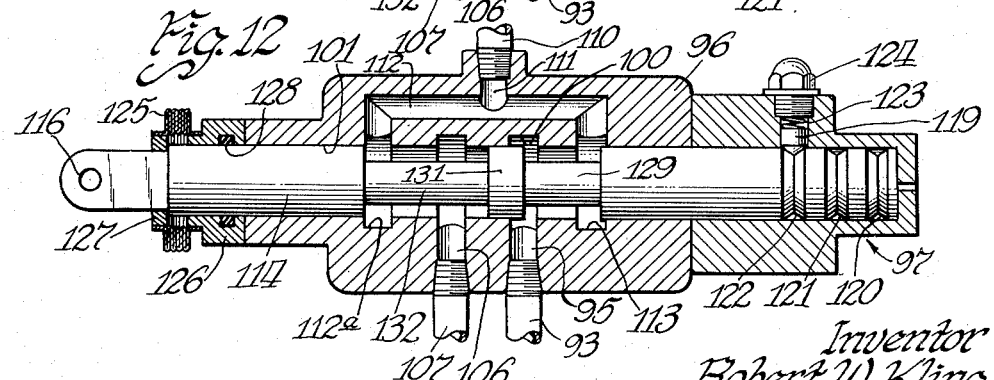
Inventor
Robert W. Kling
by Shrall Brewer
Atty.

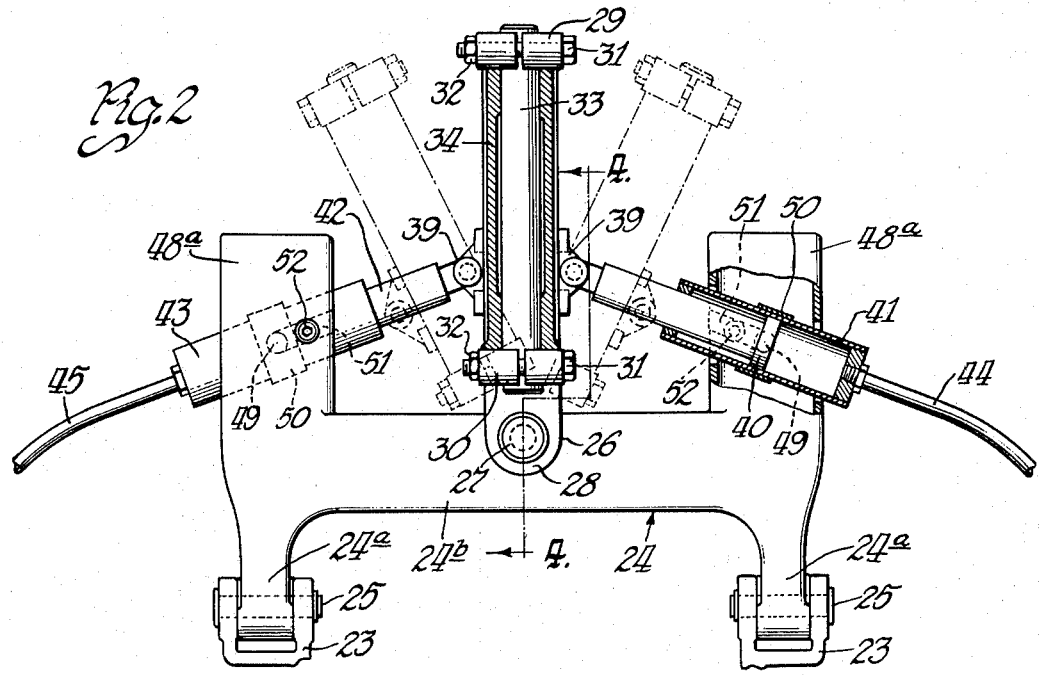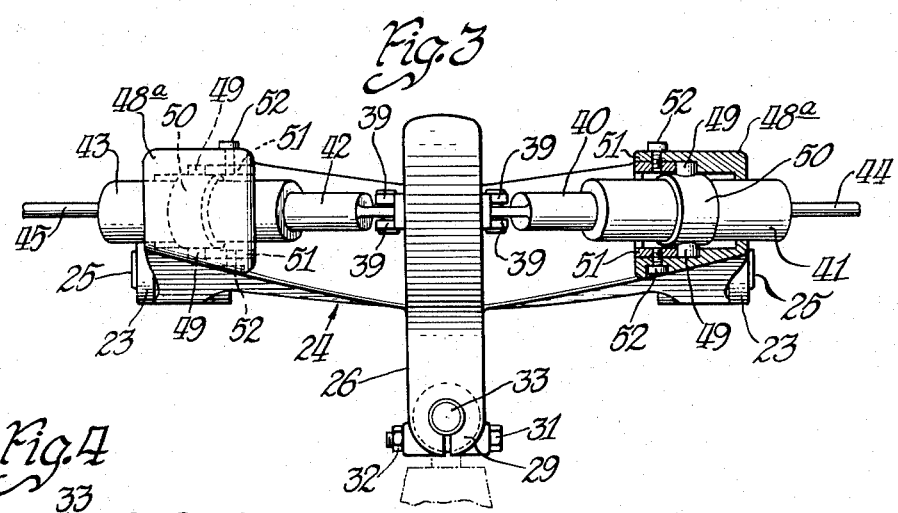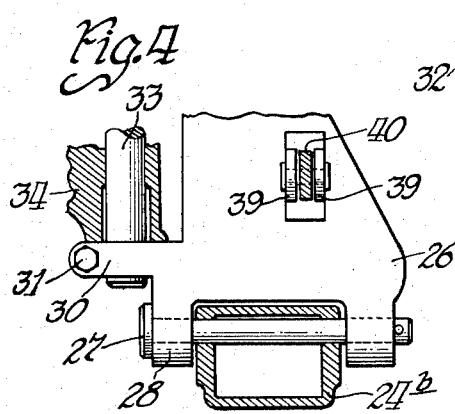

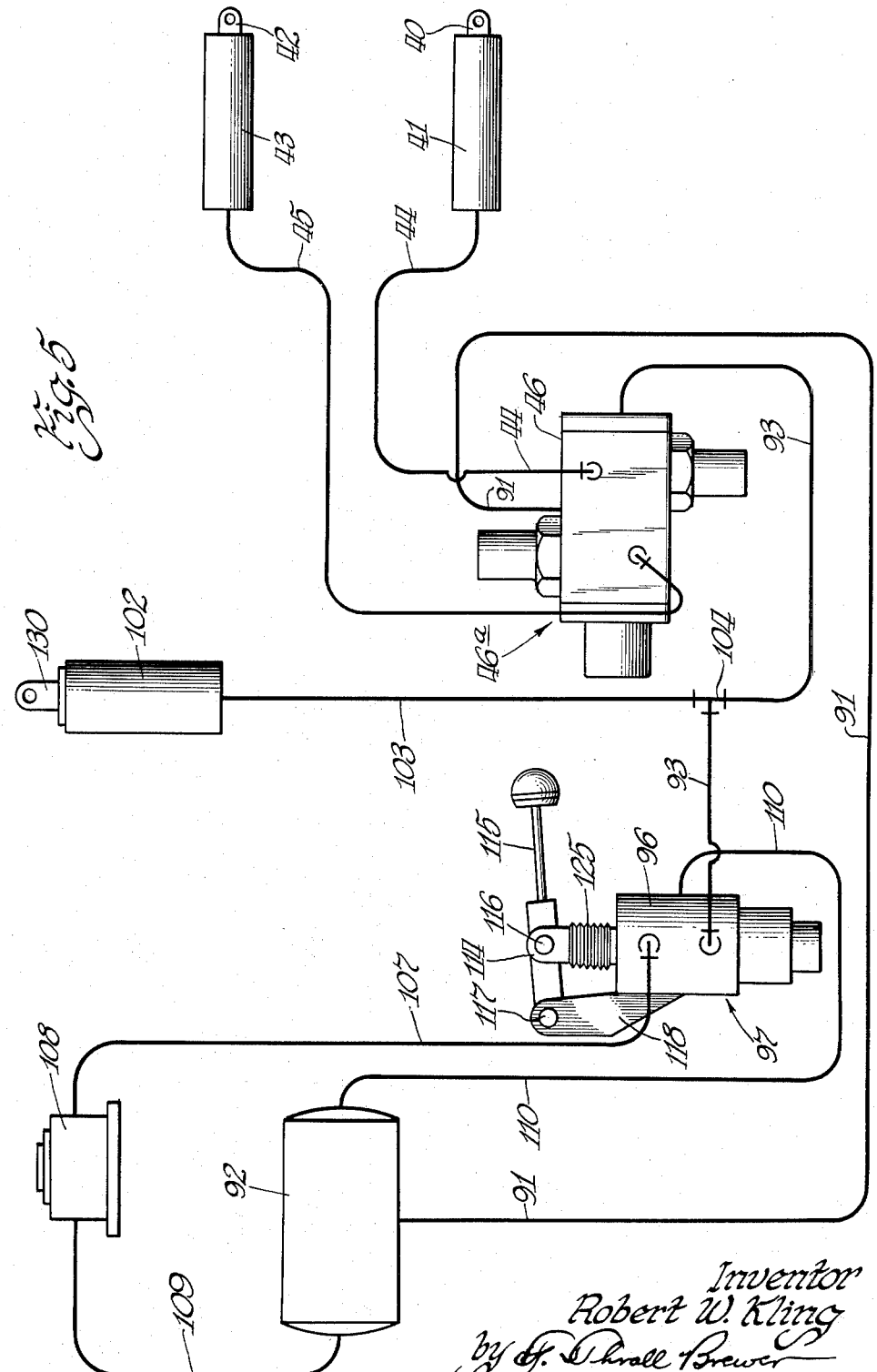

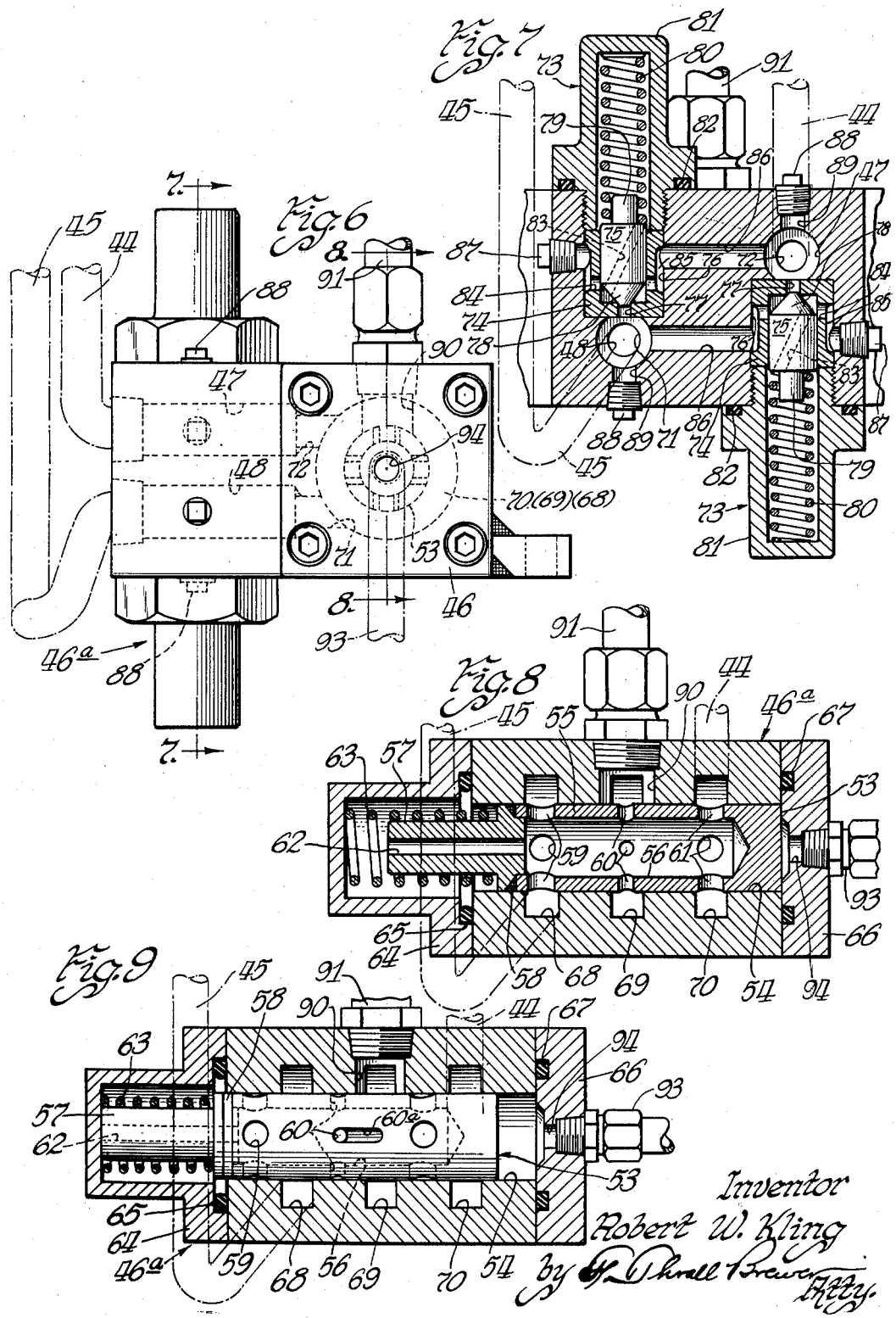

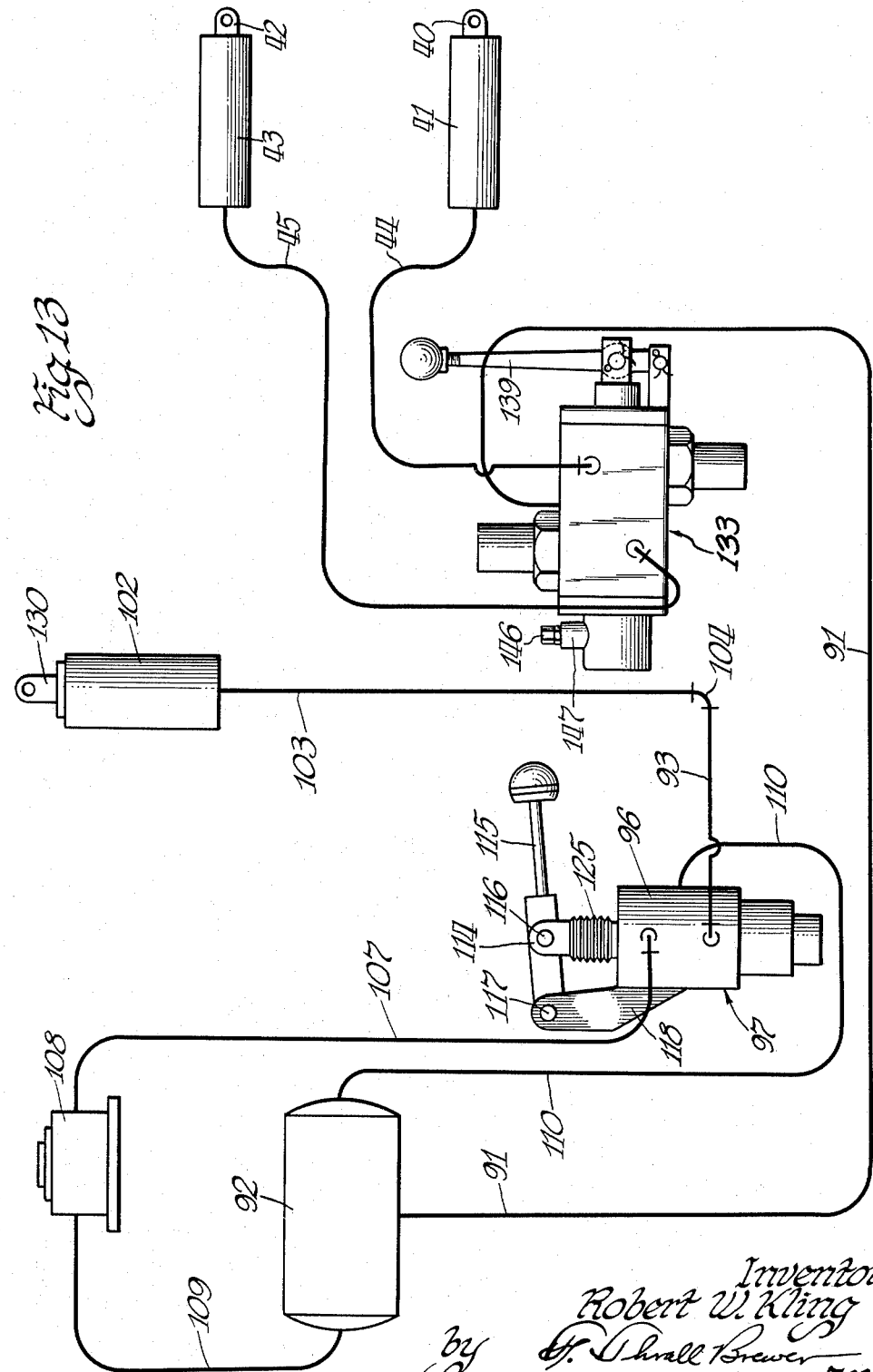

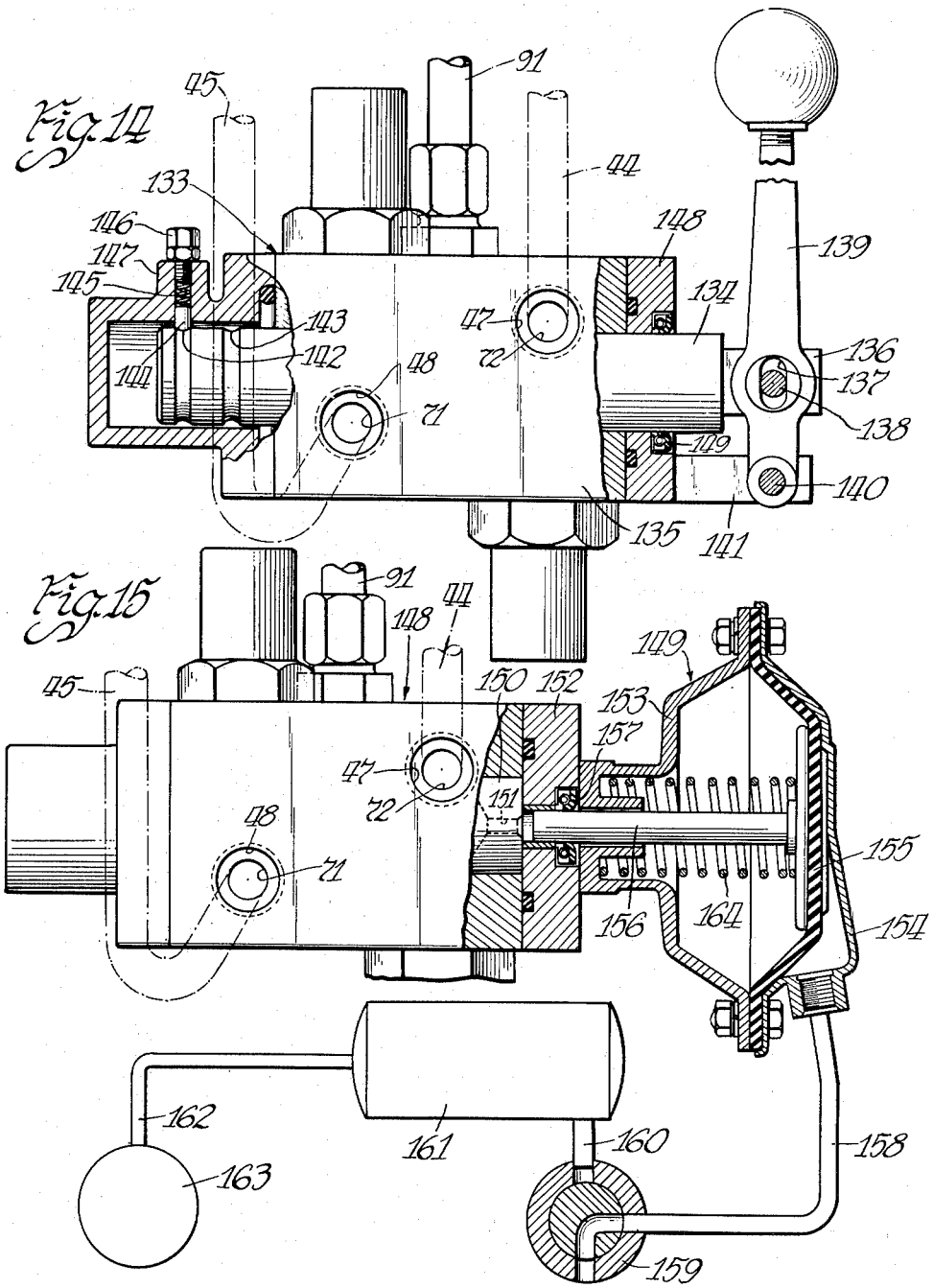

United States Patent Office 2,720,417
Patented Oct. 11, 1955

2,720,417

STABILIZING HITCH

Robert W. Kling, Chicago, Ill., assignor to Athey Products Corporation, Chicago, Ill., a corporation of Illinois Application November 24, 1951, Serial No. 258,073

24 Claims. (Cl. 298—18)

This invention relates to stabilizing hitches, and more particularly to hitches providing a plurality of degrees of freedom in movement accompanied by suitable controls for at least a portion of such movements, and adapted to uses such as the connection of a trailing vehicle to a tractor or the like.

An example of one form of trailing vehicle with which the hitch of this invention is particularly well suited to use for providing a connection to a motivating tractor, is illustrated in my copending application, Serial No. 215,285, filed March 13, 1951, and entitled Side Dump Trailer, which application was issued August 10, 1954 as Patent No. 2,686,079.

One of the objects of my invention is to provide a hitch for connecting a trailing vehicle to a motivating vehicle in a manner and by structure such that in addition to relative swiveling movements of the vehicles required for turning, the trailing vehicle may also rock laterally in reference to the motivating vehicle.

As another object, my invention comprehends a hitch of the type described which provides for relative lateral rocking movements between motivating and trailing vehicles, and which is suited to use with a trailing vehicle of the type having a side dump body by the provision of control means for locking the trailing vehicle against lateral rocking movement relative to the motivating vehicle during the dumping of the trailing vehicle body.

A further object of my invention is the provision of an overload release in association with the aforesaid control means for locking a trailing vehicle against rocking during dumping of the trailing vehicle body, whereby the locking action is relieved when excessive forces are applied to rock the body. This may occur when the body is being dumped while trailing and motivating vehicles are being driven and a bump is struck such as may be present on a rough road. The excessive forces may cause the fluid pressure in a hydraulic system used to lock the trailing vehicle against rocking to exceed certain elevated pressures that would tend to burst fluid lines of the hydraulic system. The overload release is designed to permit rocking of the trailing vehicle at a low rate.

My invention further comprehends the provision of a hitch which has freedom of relative lateral rocking movement between trailing and motivating vehicles, and which is provided with a hydraulic system for effecting stabilization of the trailing vehicle in such lateral rocking and can also prevent this lateral rocking.

Other objects and advantages of the invention will be apparent from the following description and the accompanying drawings in which similar characters of reference indicate similar parts throughout the several views.

Fig. 1 is a side elevational view showing the hitch of my invention connecting motivating and trailing vehicles;

Fig. 2 is an elevational view, partly in section, taken generally along the line 2—2 of Fig. 1 and in the direction of the arrows shown on the line;

Fig. 3 is a plan view, partly in section, of my hitch;

Fig. 4 is a view partly in section and partly in elevation, taken generally along the line 4—4 of Fig. 2 and in the direction of the arrows shown on the line;

Fig. 5 is a schematic view of a hydraulic system part of which forms a novel portion of the hitch of my invention;

Fig. 6 is an elevational view showing a device employed in my invention which consists of a piston valve and overload release valves;

Fig. 7 is a sectional view taken on a line 7—7 of Fig. 6 in the direction of the arrows and showing the overload release valves of the above device;

Fig. 8 is a sectional view taken on a line 8—8 of Fig. 6 in the direction of the arrows and showing the piston valve of the above device;

Fig. 9 is a sectional view similar to Fig. 8 but showing the piston valve in another position;

Fig. 10 is a sectional view showing a control piston valve and its housing;

Fig. 11 is a view similar to Fig. 10 but showing the control valve in another position; and Fig. 12 is a view similar to Fig. 10 but showing the control valve in still another position.

Fig. 13 is an elevational view partly in section showing a modified form of device of my invention adapted for hand operation independently of the hydraulic system employed for dumping of a trailer body;

Fig. 14 is a schematic view showing the latter device and the hydraulic system; and Fig. 15 is an elevational view, partly in section, of another modified form of my invention adapted for operation independently of the hydraulic system, together with a schematic showing of a servo mechanism for controlling the device.

The drawings illustrate exemplary embodiments of my invention which are depicted for illustrative purposes.

In the adaptation of the invention depicted in Fig. 1, a side dump trailer 18 is connected to a motivating tractor 20 through a stabilizing hitch structure 19. The motivating vehicle of tractor 20 has rear wheels 21, a rear-axle housing 21$^a$, and a frame 22. As shown in Figs. 1 and 2, transversely spaced brackets 23 are secured to the frame 22 adjacent the housing 21$^a$. The brackets 23 carry an H-structure 24 which is movably connected thereto through pins 25 which extend through the lower ends 24$^a$ of the legs of the H-structure and provide a horizontal pivot axis for the H-structure which extends laterally of the tractor. The cross bar 24$^b$ of the H-structure carries a bracket 26 on a pin 27 which extends through horizontally spaced depending ears 28 and the cross bar and provides a horizontal pivot axis for the bracket 26 which extends longitudinally of the tractor. The bracket has vertically spaced upper and lower clamps 29 and 30 provided with clamping bolts 31 and nuts 32 for holding a vertical pivot rod 33. The pivot rod passes through a bearing member 34 which fits between the clamps 29 and 30 and is secured to the forward end of a goose neck 35, attached to the front end of a chassis 36 of the trailing vehicle 18. The rear end of the chassis is supported on transversely spaced wheels, which are not shown in the present application but are more fully disclosed in my aforementioned co-pending application. The chassis 36 in the disclosed structure carries a dump body 38 which is arranged to swing laterally about a longitudinal axis to and from a dumping position, as more fully disclosed in my aforementioned co-pending application.

The bracket 26 has on its opposite sides pairs of spaced ears 39 to which are pivotally connected a piston 40, on the right as viewed in Fig. 2, movable linearly in a cylinder 41 and a piston 42, on the left, movable in a cylinder 43. Fluid lines 44 and 45 are connected respectively to the cylinders 41 and 43 and to a remotely controlled fluid-actuated housing 46 forming part of a compound valve device 46a, at openings or passages 47 and 48, respectively (Figs. 6 and 7). The cylinders 41 and 43 are mounted in the upper portions 48a of the legs of the H-structure 24, being pivoted thereto by trunnions 49 which are held in slots in the leg portions 48a of the H-structure 24 by retaining pieces 51 removably held in the slots by screws 52.

With the aid of a suitable system of apparatus and controls, the structure as thus far described is adapted to uses, such as locking the trailer chassis structure in a fixed position relative to the tractor while the trailer body is dumped, and to the provision of damped or controlled freedom of lateral rocking movements of the trailer relative to the tractor during the motivation of the trailer by the tractor. In the disclosed system of apparatus and controls, it may be observed that the locking of the trailer position is insured during the dumping of the trailer body, and freedom of the trailer for lateral movement relative to the tractor follows the return of the trailer body to its lowered position.

The valve device 46a comprises, in addition to the housing 46, a blocking valve 53, which is in the form of a hollow valve and which is mounted for linear movement in a bore 54 in the valve housing 46. The valve 53 is made of a hollow member 55, having a bore 56 extending from one end but ending in spaced relation to the other end, and of a reduced member 57 suitably secured as by a weld 58 in the open end of the member 55. The hollow member 55 has three sets of openings 59, 60 and 61 in the bore 56. Each may comprise four openings equally spaced about the bore 56. The openings 59 are near the reduced member 57 or the open end of the member 55. The openings 60 are at a mid region of the member 55, and one of them is elongated as indicated at 60a in Fig. 9. The openings 61 are near the closed end of the member 55. The member 57 has a drain opening 62 and receives a coil spring 63 which urges the valve 53 to the right as viewed in Figs. 8 and 9. The spring 63 and the reduced member 57 lie in a closure member 64 which is secured to the housing 46 with a seal 65 clamped between them and closes one end of the bore 54. The other end of the bore 54 is closed by a mmeber 66 which is secured to the housing 46 with a seal 67 therebetween. Annular grooves 68, 69 and 70 encompass the bore 54 at the openings 59, 60 and 61, respectively, in the position of Fig. 8. The grooves 68 and 70 are respectively in communication with the lines 45 and 44 through the passages 48 and 47 at which the lines 45 and 44 are connected and reduced extensions 71 and 72 of these passages (Fig. 6).

Fig. 7 illustrates a pair of relief valves 73, the left-hand one of which is associated with the passage 48 and line 45 and the right-hand one of which is associated with the passage 47 and line 44 as viewed in Fig. 7. Each valve 73 comprises a cup-shaped valve seat 74 and a plug-like valve element 75 resting within the valve seat 74. The valve seat rests in the end of a bore 76 which intersects the passage 47 or 48. The end of the valve seat 74 has a central opening 77 which is closed by a conical tip 78 on the valve element 75. The latter has a reduced extension 79 which receives a coil spring 80 which urges the conical valve tip 78 into closing engagement with the valve seat opening 77. The spring 80 extends into a hollow member 81 which is threaded into the housing 46 and holds the valve seat 74 in the position shown. A ring seal 82 acts between the housing 46 and the hollow member 81. The valve element 75 has a passage 83 providing for the escape of fluid from the hollow member 81. The valve seat 74 has passages 84 leading from the interior of the valve seat to a relatively long exterior annular groove 85. A passage 86 leads from the bore 76 and the exterior groove 85 at the left as viewed in Fig. 7 to the passage 47. A similar passage 86 leads from the bore 76 and the exterior groove at the right in Fig. 7 to the passage 48. Plugs 87 close the passages 86 at the sides of the housing 46. Plugs 88 close passages 89 which are aligned with the bores 76 but on opposite sides of the passages 86.

As shown in Fig. 9, a passage 90 is formed in the housing at the annular groove 69. A line 91 leads from the passage 90 to a tank or reservoir 92 and supplies fluid to make up for any that may be lost in pistons and cylinders, the lines 44 and 45, or the valve assembly 46a. A line 93 is connected to a passage 94 formed in the member 66 and leading to the closed end of the valve 53 which is opposite to the end at which the spring 63 is positioned. The line 93 connects the bore 54 in the housing 46 at the closed end of the valve 53 with a passage 95 in a housing 96 of a valve assembly 97 and thence to an annular groove 100 which encompasses a bore 101 in the housing 96. A dumping cylinder 102 by which the trailer body is actuated for dumping purposes, is connected with the line 93 through a line 103 and a T-fitting 104 in line 93, as shown in Fig. 5. An annular groove 105 in the housing bore 101 is spaced longitudinally of the bore from the groove 100, and is connected through a passage 106 in the housing 96 and a fluid line 107 to a pump 108. A fluid flow line 109 connects the pump and the tank 92.

Another fluid line 110 connects the tank 92 and the valve housing 96 at a passage 111 which is connected with a passage 112 the ends of which communicate with annular grooves 112a and 113. These grooves encompass the bore 101 in the housing 96 at spaced positions on opposite sides of the grooves 100 and 105. The valve assembly 97 comprises, in addition to the housing 96, a control valve 114, which is in the form of a spool valve. This control valve is mounted for linear sliding movement in the housing 96 and is positionable by a manually operable lever 115 connected thereto at 116. The lever is pivoted at 117 on a bracket extension 118 secured to the valve housing 96. The control valve 114 is held in the positions of Figs. 10, 11 and 12 by a detent 119 which is urged into any of three circumferential grooves 120, 121 or 122 in one end of the control valve by a spring 123 backed by a plug 124 threaded into the valve housing 96. A bellows type seal 125 is attached to a collar 126 secured to the open end of the valve housing, through which the control valve is extended for affording an actuating connection thereto, and to a ring 127 secured to the control valve near its exposed end, to provide a fluid seal. An annular seal 128 in the collar 126 also aids in providing a seal between the control valve and the valve housing.

When the blocking valve 53 is in the position of Fig. 8, the openings 59 and 61 thereof are at the annular grooves 68 and 70 to which the lines 45 and 44 are connected, which lines connect to the cylinders 43 and 41. In this instance, the fluid may flow from cylinder 41 through line 44 through passages 47 and 72 and annular groove 70 in housing 46, passages 61, bore 56 and passages 59 in valve 53, annular groove 68 and passages 71 and 48 in housing 46, and line 45 into cylinder 43. Thus, the pistons 40 and 42 may move in the cylinders 41 and 43 and the bearing member 34 may rock with respect to the H-structure 24 to the dash-pot positions shown in Fig. 2. Such action is effected by relative rocking movements between the trailer and tractor, as a result of road unevenness and the like.

When the blocking valve 53 is in the position of Fig. 9, it prevents the flow of fluid between the lines 44 and 45 below a certain elevated pressure, say 3000 lbs. per square inch, by covering the passages 68 and 70. When this happens, the pistons 40 and 42 are locked against movement with respect to the cylinders 41 and 43 because they contain a quantity of relatively non-compressible liquid which cannot flow, and so the bearing member 34 is held against rocking movement. Thus, the trailer 18 may not rock laterally with respect to the tractor 20.

The positions of the blocking valve 53, as shown in Figs. 8 and 9, are determined by the positions of the manually operable valve 114 indicated in Figs. 10 and 11. In the position of Fig. 10, fluid under pressure flows from the pump 108 through line 107 into the cylinder of control valve 97, past a reduced portion 129 on the control valve piston 114 and out through the line 93 to the bore 54 of valve housing 46 at the closed end of the blocking valve 53. The blocking valve is moved against the action of the coil spring 63 to a position in which the reduced member 57 contacts the ends of the closure member 64 and the openings 59 and 61 are displaced from the annular grooves 68 and 70 so as to be covered and closed by the bore 54. The blocking valve 53 when thus positioned blocks communication between lines 44 and 45. Thus the pistons 40 and 42 cannot move in their cylinders, because the flow of fluid between such cylinders is blocked, and the trailer 18 is held against lateral rocking with respect to tractor 20. At the same time, the pressure fluid in the line 93 goes through the fitting 104 and the line 103 into the dumping cylinder 102, the associated piston 130 of which moves the body 38 to dumping position. Thus, when the body is being moved to dumping position, the trailer may not rock laterally with respect to the tractor, if the fluid pressure within the stabilizing cylinders 41 and 43 does not exceed an elevated pressure as aforesaid.

In the position of the control valve depicted in Fig. 11, the pressure fluid coming from the pump 108 through the line 107 can no longer flow into the line 93, because of the blocking action by a land 131 on the control valve 114, but the pump line 107 is connected with the tank line 110 by way of passage 106, groove 105, a reduced portion 132 on the control valve, groove 112a, and passages 111 and 112, and so the pump moves pressure fluid directly to the tank. Although pressure fluid is not supplied to the dumping cylinder 102 and against the closed end of the piston valve 53, the fluid cannot escape from these parts, and so the trailer 18 remains locked against lateral rocking. The body 38 is held in dumping position by the dumping cylinder.

When the control valve 114 is placed in the position of Fig. 12, fluid may escape from the line 93 to the tank line 110 by way of annular groove 100, reduced portion 129 on the control valve 114, annular groove 113, and passages 112 and 111. Thus, the fluid pressure at the closed end of the blocking valve 53 in the line 93 is reduced at least to the level of the tank-connected line 91 which leads through passage 90, annular groove 69 and elongated opening 60a and bore 56 in valve member 55 and passage 62 in reduced member 57 to the left end of the blocking valve 53 as viewed in Figs. 8 and 9, and so the spring 63 returns the blocking valve 53 to the position of Fig. 8. In this position there is communication between the lines 44 and 45, and so the pistons 40 and 42 may move in their cylinders 41 and 43. Thus the trailer 18 may again rock with respect to the tractor 20.

Some truck drivers frequently dump the trailer body 38 while driving the tractor 20 and trailer 18 at some appreciable speed, say, 15 miles per hour. With the trailer 18 locked against rocking movement with respect to the tractor 20 by holding of the pistons 40 and 42 against movement in their cylinders 41 and 43 through the blocking action of valve 53 in the position of Fig. 9, there is considerable likelihood that striking a bump in the road, as may occur on a rough road, will cause an excessive fluid presure in the lines 44 and 45 which will burst these lines. Consequently, I have provided the overload relief valves 73 illustrated in Fig. 7, which are adapted to open when the pressure in lines 44 and 45 exceeds some elevated value, say, 3000 lbs. per square inch. Assume the pressure in line 44 exceeds this value.

Line 44 being connected with passages 47 and 72 in housing 46, this excessive pressure will act against the right-hand plug valve 75 moving it out of seating engagement with the orifice 77 in valve seat 74 against the action of the spring 80. Pressure fluid now escapes past the conical valve tip 78 through the openings 84 and the annular groove 85, the lower passage 86 and passages 71 and 48 to the line 45. Thus the pistons 40 and 42 may move in their cylinders 41 and 43, the trailer 18 may rock with respect to the tractor 20, and the excessive pressure is relieved. If the excessive pressure develops in the line 45, it is transmitted through passages 48 and 71 to the left-hand valve 73 in Fig. 7. The result is that left-hand plug valve 75 is lifted off its seat on the orifice 77 in the valve seat 74, and pressure fluids flows through the upper passage 86 and passages 72 and 47 to the line 44. The pistons 40 and 42 may now move in their cylinders 41 and 43, the trailer 18 may rock with respect to the tractor 20, and the excessive pressure is relieved. When either overload valve 73 is open, a movement of the trailer 18 with respect to the tractor 20 is limited as to speed, say for example, one inch per second measured at the pistons 40 and 42 and cylinders 41 and 43, because the orifice in the valve seat 74 is of restricted size.

The pistons 40 and 42, the cylinders 41 and 43, the lines 44 and 45, and the housing 46 in the position of Fig. 8 constitute an hydraulic system that stabilizes the trailer against rocking with respect to the tractor, even though it does not prevent such rocking. When the trailer rocks, it moves the pistons 40 and 42 with which it is connected. Movement of the pistons requires the movement of fluid through the cylinders 41 and 43, the lines 44 and 45, and the housing 46. The resistance to such fluid movement tends to stabilize the trailer with respect to the tractor.

In some installations it is desirable and advantageous to operate the valve assembly controlling movements of the pistons 40 and 42 in cylinders 41 and 43 independently of the piston 130 in dumping cylinder 102. In these cases the modifications of my invention illustrated in Figs. 13, 14 and 15 may be employed.

In a valve assembly 133 shown in Figs. 13 and 14 a blocking valve 134 has one end projecting from a valve housing 135 and provided with a reduced portion 136 having a slot 137. The slot accommodates a pin 138 on a lever 139 pivoted at 140 on a bracket 141 secured to the valve housing 135. The other end of the blocking valve 134 has grooves 142 and 143, which are engageable by a detent 144 which is urged by a spring 145 backed by an adjustable threaded plug 146 in a protuberance 147 formed on the valve housing 135. The valve housing includes an end member 148 which carries an oil seal 149 embracing the protruding end of the blocking valve 134. The blocking valve is shifted between blocking and passing positions determined by engagement of the detent 144 with the groove 142, by manual operation of the lever 139. Except for the above, the blocking valve 134 and the valve housing 135 are respectively like the blocking valve 53 and the valve housing 46 of Figs. 6 to 9. When it is desired to dump the body 38, the lever 139 is manually operated to shift the blocking valve 134 to the blocking position, in which the detent 144 engages the groove 143, and then the control valve 97 is operated to supply pressure fluid to the cylinder 102 to shift the piston 130 for tilting the body 38. After the body is returned to its non-dumping position, the blocking valve 134 is returned to the position of Fig. 14 so that the trailer 18 may again rock laterally with respect to the tractor 20.

The valve assembly 148 of Fig. 15 differs from the valve assembly 133 in being manually operated by a servo mechanism 149. A blocking valve 150 has a drain opening 151 at one end. The servo mechanism 149 has a casing comprising an end member 152 secured to the valve housing, a hollow flaring part 153 secured to the ring 152, and a cap 154 secured to the part 153 to clamp a diaphragm 155, which is formed of a suitable flexible material such as rubber or a synthetic compound. A plunger 156 which is secured to the diaphragm 155 is slidably mounted in the end member 152. An oil seal 157 is provided on the ring 152 about the plunger 156. A line 158 leads from the cap 154 to a control valve 159 whence a line 160 goes to a reservoir 161. A line 162 connects the reservoir 161 and a pump 163 for a suitable fluid. A spring 164 on the plunger 156 urges the plunger to the position of Fig. 15.

Except for the above the valve assembly of Fig. 15 is like that of Figs. 6 to 9. When the body 38 is to be dumped, first the valve 159 is adjusted to supply fluid through the line 158 to the diaphragm 155 to make the latter move the plunger 156 against the blocking valve 150 to shift the same to blocking position. Then the control valve 97 is operated to shift the piston 130 in the cylinder 102 for dumping of the body. After the body is returned to non-dumping position, the valve 159 is turned to exhaust position, and the spring 164 returns the plunger 156 to the position of Fig. 15. The spring in the valve housing returns the blocking valve 150 to non-blocking position in which the pistons 40 and 42 may move in their cylinders 41 and 43 and the trailer 18 may rock with respect to the tractor 20.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a hitch adapted to connect a motivating vehicle and a trailing vehicle having a body dumping laterally with respect thereto, means providing for lateral rocking of the trailing vehicle with respect to the motivating vehicle, an hydraulic system having piston and cylinder elements acting between the motivating and trailing vehicles for stabilizing the trailing vehicle in its lateral rocking, and valve means in the hydraulic system to prevent the aforesaid lateral rocking of the trailing vehicle relative to the motivating vehicle during dumping of the said body.

2. In a hitch adapted to connect a motivating vehicle and a trailing dumping vehicle, means providing for rocking of the trailing vehicle with respect to the motivating vehicle, an hydraulic system having piston and cylinder elements acting between the motivating and trailing vehicles for preventing the aforesaid rocking during dumping under the application of ordinary rocking forces and having relief valve means for permitting rocking under the application of an excessive rocking force.

3. In a hitch adapted to connect a motivating vehicle and a trailing vehicle, a combination comprising means provided for relative rocking of the vehicles, two opposed sets of piston and cylinder members, means connecting one member of each set with the motivating vehicle, means connecting the other member of each set with the trailing vehicle, a fluid line interconnecting the sets, a block for said line, and means responsive to dumping of the trailing vehicle for shifting the block into blocking position in the fluid line whereby relative movement of piston and cylinder members of each set is thereby prevented.

4. In a hitch as specified in claim 3, the means for shifting the block comprising a housing having a bore slidably receiving the block, a pump supplying pressure fluid, a control valve associated with the pump and housing bore so as alternately to connect the pump and the housing bore with drain, the pump with the housing bore, or the pump with drain while preventing escape of fluid from the housing.

5. In a hitch adapted to connect a motivating vehicle and a trailing vehicle, a combination comprising means providing for relative rocking of the vehicles, two opposed sets of piston and cylinder members, means connecting one member of each set with the motivating vehicle, means connecting the other member of each set with the trailing vehicle, a fluid line interconnecting the sets, a block for said line, means responsive to dumping of the trailing vehicle for shifting the block into blocking position in the fluid line whereby relative movement of piston and cylinder members of each set is thereby prevented, and means responsive to an elevated pressure in the fluid line for by-passing the block to permit relative movements of piston and cylinder members during dumping.

6. In a hitch as specified in claim 5, the by-passing means comprising two passages around the block, and two relief valves, one being located in one passage and being responsive to an elevated pressure in the fluid line to one side of the block to open the one passage, the other being located in the other passage and being responsive to an elevated pressure in the fluid line to the other side of the block to open the other passage.

7. In a hitch adapted to connect a motivating vehicle and a trailing vehicle having a body dumping laterally with respect thereto by means of an hydraulic device powered by a pump driven by the motivating vehicle, means providing for lateral rocking of the trailing vehicle with respect to the motivating vehicle, an hydraulic system including piston and cylinder elements connected to the motivating and trailing vehicles for stabilizing the trailing vehicle in its lateral rocking, valve means in the hydraulic system to prevent the aforesaid lateral rocking during dumping of the said body, and a fluid line connecting the last mentioned means with a reservoir connected with the pump.

8. In a hitch adapted to connect a motivating vehicle and a trailing vehicle, a combination comprising means providing for relative rocking of the vehicles, two opposed sets of piston and cylinder members, means connecting one member of each set with the motivating vehicle, means connecting the other member of each set with the trailing vehicle, a valve housing having a bore, fluid lines leading from the sets to passages into the bore spaced lengthwise thereof, a hollow blocking valve slidable in the bore and having a pair of axially spaced openings through the wall of the blocking valve with a spacing corresponding to that of the passages, and means for shifting the blocking valve between a first position in which the openings in the blocking valve overlap the aforesaid passages into the housing bore to provide a fluid connection from one piston-and-cylinder set to the other through the lines, the passages in the housing, and the openings and the interior of the blocking valve, and a second position in which the openings of the blocking valve are out of overlapping relation with the aforesaid regions of the housing bore and the wall of the blocking valve interrupts the fluid connection between the piston-and-cylinder sets.

9. In a hitch as specified in claim 8, the trailing vehicle being dumped by an hydraulic device powered by a pump, the hollow blocking valve having a closed end, an open end, detent-receiving grooves at the open end for determining the said positions of the hollow valve, and an intermediate opening between the two axially spaced openings in the wall of the blocking valve, the valve housing having an intermediate passage always registering with the said intermediate opening regardless of position of the blocking valve, the combination of 8 further comprising means connecting the inter passage in the valve housing with a reservoir s the pump.

10. In a hitch as specified in claim 9, the of the hollow blocking valve protruding fr housing, the combination of claim 9 furth a lever mounted on the valve housing and connected with the protruding closed end of the blocking valve for shifting it between its said positions.

11. In a hitch as specified in claim 8, the housing also including two by-passes between the said passages, two relief valves, one in one by-pass and the other in the other by-pass, means responsive to an elevated pressure in the fluid line connecting the valve housing and one set of piston-and-cylinder members for opening the said one relief valve, and means responsive to an elevated pressure in the fluid line connecting the valve housing and the other set of piston-and-cylinder members for opening the said other relief valve.

12. In a hitch as specified in claim 8, the trailing vehicle being dumped by an hydraulic device powered by a pump, the hollow blocking valve having a third opening through its wall between the said axially spaced openings, the combination of claim 8 further comprising a line connecting a reservoir supplying the said pump and the valve housing and being in continuous communication with the third opening in the hollow valve in all its positions.

13. In a hitch as specified in claim 8, the trailing vehicle being dumped by an hydraulic device powered by a pump, the hollow blocking valve having an intermediate opening between the two axially spaced openings, the valve housing having an intermediate passage always registering with the intermediate opening regardless of the position of the blocking valve, the combination of claim 8 further comprising means connecting the intermediate passage in the valve housing with a reservoir connected with the pump, a spring acting between one end of the blocking valve and one end of the valve housing, and servo means for shifting the hollow valve in the valve housing against the action of the spring, said servo means comprising a casing attached to the end of the valve housing opposite the spring, a plunger positioned in the casing so as to be engageable with the end of the hollow valve opposite the spring, a diaphragm mounted in the casing and attached to the plunger, means for supplying a fluid to the diaphragm to make the diaphragm shift the hollow valve against the action of the spring, and a spring for shifting the plunger away from the hollow valve.

14. In a hitch as specified in claim 8, the trailing vehicle being dumped by an hydraulic device, the means for shifting the blocking valve comprising a fluid line connected to the bore of the fitting at one end of the blocking valve and being adapted to receive pressure fluid from the same source as the said hydraulic device.

15. In a hitch adapted to connect a motivating vehicle and a trailing vehicle adapted to be dumped by an hydraulic device, a combination comprising means providing for relative rocking of the vehicles, two opposed sets of piston and cylinder members, means connecting one member of each set with the motivating vehicle, means connecting the other member of each set with the trailing vehicle, a valve housing having a bore, fluid lines leading from the sets of passages into the bore spaced lengthwise thereof, a hollow blocking valve slidable in the bore and having a pair of axially spaced openings through the wall of the blocking valve with a spacing corresponding to that of the passages, and means responsive to dumping of the trailing vehicle for shifting the blocking valve between a first position in which the openings in the blocking valve overlap the aforesaid passages into the housing bore to provide a fluid connection from one piston-and-cylinder set to the other through the lines, the passages in the housing, and the openings and the interior of the blocking valve, and a second position in which the openings of the blocking valve are out of overlapping relation with the aforesaid regions of the housing bore and the wall of the blocking valve interrupts the fluid connection between the piston-and-cylinder sets, the aforesaid means for shifting the blocking valve comprising a pressure fluid supply connected to the bore of the housing at one end of the blocking valve and being adapted to receive pressure fluid from the same source as the said hydraulic device.

16. In a hitch as specified in claim 15, the trailing vehicle being dumped by an hydraulic device powered by a pump, the hollow blocking valve having a closed end, an open end, and an intermediate opening between the two axially spaced openings in the wall of the blocking valve, the said first position of the hollow valve being determined by contact of the closed end of the hollow valve with one end of the valve housing, the said second position being determined by contact of the open end of the hollow valve with the other end of the valve housing, the valve housing having an intermediate passage always registering with the said intermediate opening regardless of the position of the blocking valve, the means for shifting the blocking valve comprising a pump supplying pressure fluid, means connecting the intermediate passage in the valve housing with a reservoir connected with the pump, a spring acting between the open end of the blocking valve and the valve housing, a control valve associated with the pump and the valve housing at the closed end of the blocking valve so as alternately to connect the pump and the valve-housing bore at the closed end of the blocking valve with drain, the pump with the valve-housing bore at the closed end of the blocking valve with no connection to drain, or the pump with drain while preventing escape of fluid from the valve housing at the closed end of the blocking valve.

17. In a hitch adapted to connect a motivating vehicle and a trailing vehicle, a combination comprising means provided for relative rocking of the vehicles, two opposed sets of piston and cylinder members, means connecting one member of each set with the motivating vehicle, means connecting the other member of each set with the trailing vehicle, fluid lines running from the sets, and a valve assembly connected to the fluid lines and comprising a valve housing, a blocking valve slidable in the housing so as to have one end enclosed by the housing and the other end protruding therefrom, and a lever mounted on the valve housing and connected with the protruding end of the blocking valve for manual operation thereof.

18. In a hitch as specified in claim 17, the blocking valve being hollow, open at the said one end and closed at the said other end, and having detent-receiving recesses at the said one end for determining positions in which the blocking valve passes fluid between the fluid lines and prevents fluid from passing therebetween.

19. In a hitch adapted to connect a motivating vehicle and a trailing vehicle, a combination comprising means provided for relative rocking of the vehicles, two opposed sets of piston and cylinder members, means connecting one member of each set with the motivating vehicle, means connecting the other member of each set with the trailing vehicle, fluid lines running from the sets, and a valve assembly connected to the fluid lines and comprising a valve housing, a blocking valve slidable in the housing, and servo means comprising a casing secured to one end of the valve housing, a plunger mounted in the casing and adapted to extend into the housing to engage the blocking valve, a diaphragm attached to and within the casing, and means for applying a fluid to the diaphragm to make the plunger shift the blocking valve.

20. In a hitch as specified in claim 19, the blocking valve being hollow and open at both ends, the valve assembly further comprising a spring acting between the end of the valve housing opposite the servo means and the adjacent end of the blocking valve for urging the blocking valve toward the servo means, and another spring acting between the casing and the plunger for urging the plunger away from the blocking valve.

21. In a hitch adapted to connect and partially support a trailing vehicle to and on a motivating vehicle, a combination comprising an H-structure adapted to be pivotally connected on a transverse horizontal axis through the lower ends of its legs to the motivating vehicle, a bracket pivotally connected to the cross bar of the H-structure on a longitudinal horizontal axis transverse to the said cross bar and being adapted to receive the forward end of the trailing vehicle in a connection involving a vertical pivot axis, cylinders mounted in the upper ends of the legs of the H-structure, pistons connected to opposite sides of the bracket and slidably mounted in the cylinders, a fluid line connecting the cylinders, and means responsive to dumping of the trailing vehicle for inserting a block in the fluid line to prevent relative movement of the pistons and cylinders and rocking of the bracket and the trailing vehicle with respect to the H-structure and the motivating vehicle about the longitudinal horizontal axis.

22. In a hitch as specified in claim 21, the combination further comprising two by-passes around the block, two valves, one in one by-pass and the other in the other by-pass, means responsive to an excessive pressure in the fluid line between one cylinder and the block for opening the said one valve, and means responsive to an excessive pressure in the fluid line between the other cylinder and the block for opening the said other valve.

23. In a hitch adapted to connect a motivating vehicle and a trailing vehicle having a body dumping laterally with respect thereto, means providing for lateral rocking of the trailing vehicle with respect to the motivating vehicle, an hydraulic system having piston and cylinder elements acting between the motivating and trailing vehicle for stabilizing the trailing vehicle in its lateral rocking, selective valve means in the hydraulic system effectively locking said piston and cylinder elements during dumping of the said body to prevent the aforesaid lateral rocking and releasing said piston and cylinder elements for the aforesaid lateral rocking when the body is in its normal position.

24. In a hitch adapted to connect and partially support a trailing vehicle to and on a motivating vehicle so as to provide for relative movements of the vehicles about three perpendicularly related axes, selectively operable hydraulic means including piston and cylinder elements additionally connecting the trailing and motivating vehicles for preventing said relative movements about one of the said axes during dumping of the trailing vehicle, and valve means responsive to the application of excessive forces tending to produce relative movements about the said one axis during dumping of the trailing vehicle for rendering the selectively operable hydraulic means ineffective.

References Cited in the file of this patent

UNITED STATES PATENTS

| | | |
|---|---|---|
| 2,187,970 | Greer | Jan. 23, 1940 |
| 2,350,141 | Wood | May 30, 1944 |
| 2,362,262 | French | Nov. 7, 1944 |
| 2,399,278 | Le Tourneau | Apr. 30, 1946 |
| 2,603,531 | Gustafson | July 15, 1952 |